Figure 1:
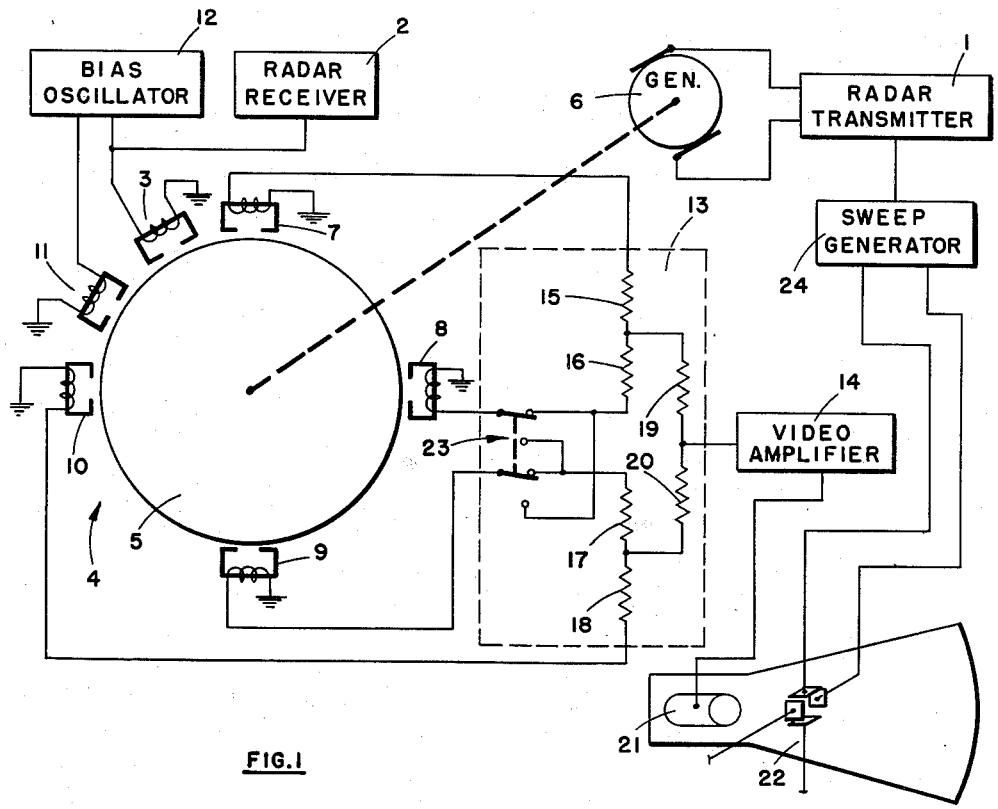

April 19, 1960  R. M. ASHBY  2,933,724
MAGNETIC RECORDING DATA ANALYZER
Filed Nov. 9, 1954  2 Sheets-Sheet 1

INVENTOR.
ROBERT M. ASHBY
BY William R. Lane
ATTORNEY

United States Patent Office 2,933,724
Patented Apr. 19, 1960

2,933,724

MAGNETIC RECORDING DATA ANALYZER

Robert M. Ashby, Pasadena, Calif., assignor to North American Aviation, Inc.

Application November 9, 1954, Serial No. 467,704

13 Claims. (Cl. 343—7.7)

This invention pertains to a data analyzer using magnetic recorders and, in a particular application, to a method of processing radar information to provide moving target indication enabling detection of targets by reason of their velocity.

The handling of information contained in electrical signals is confronted with several problems such as noise, small signal amplitude, minute signal variance, selection and comparison of successive signals.

For example, in the operation of radar, particularly airborne, it is observed that echoes from stationary objects and the ground fill a large part of the indicator with a continuous display. These echoes, or video return signals are generally a hindrance in the detection of moving targets and are called "clutter." A moving vehicle is able to remain undetected because its echo is indistinguishable against the background of the clutter. This invention contemplates using magnetic recording to analyze the information by storing successive returning signals for a finite period of time and to analyze several signals simultaneously to indicate a moving target. This system of accumulating and processing the information contained in several signals makes for increased range and sensitivity of the radar and, by extracting several of the return signals at the same time, information received is better defined, the signal-to-noise ratio and the angular resolution of the radar having been increased. In order to extract moving target information from conventional radar signals, successive signals are retained for a period of time. The general idea is to compare succeeding video, including clutter, signals and determine the average of any amplitude modulation the presence of which is indicative of moving targets.

The device of the invention is equally suitable to the analysis of successive and repetitive signals from other sources. The analyzed output signal is, as previously mentioned, better defined, has improved signal-to-noise ratio, and includes information as to the variance in successive signals.

It is therefore an object of this invention to provide a method of storing and analyzing electrical signals.

It is another object of this invention to provide a method of comparing successive electrical signals.

Another object of this invention is to provide a method of moving target indication.

Another object of this invention is to provide a method of target selection by velocity.

Another object of this invention is to provide a method of obtaining greater angular resolution of both moving and fixed targets in a radar system.

It is a further object of this invention to provide a method of moving target indication having improved signal-to-noise ratio.

Another object of this invention is to provide a data analyzing device.

Still another object of this invention is to provide a magnetic recording device capable of extracting moving target information from radar return signals.

Figure 2:
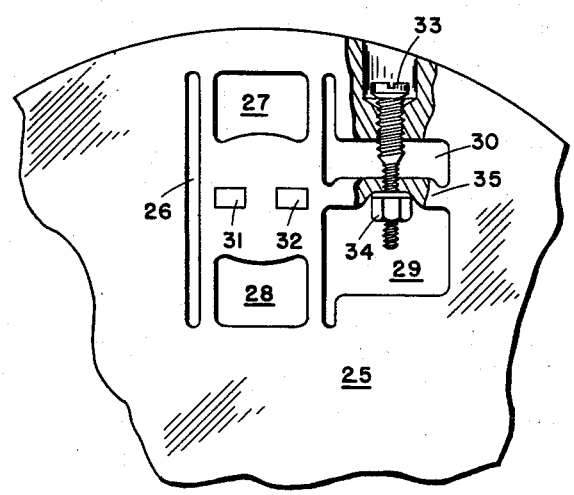
Figure 3:
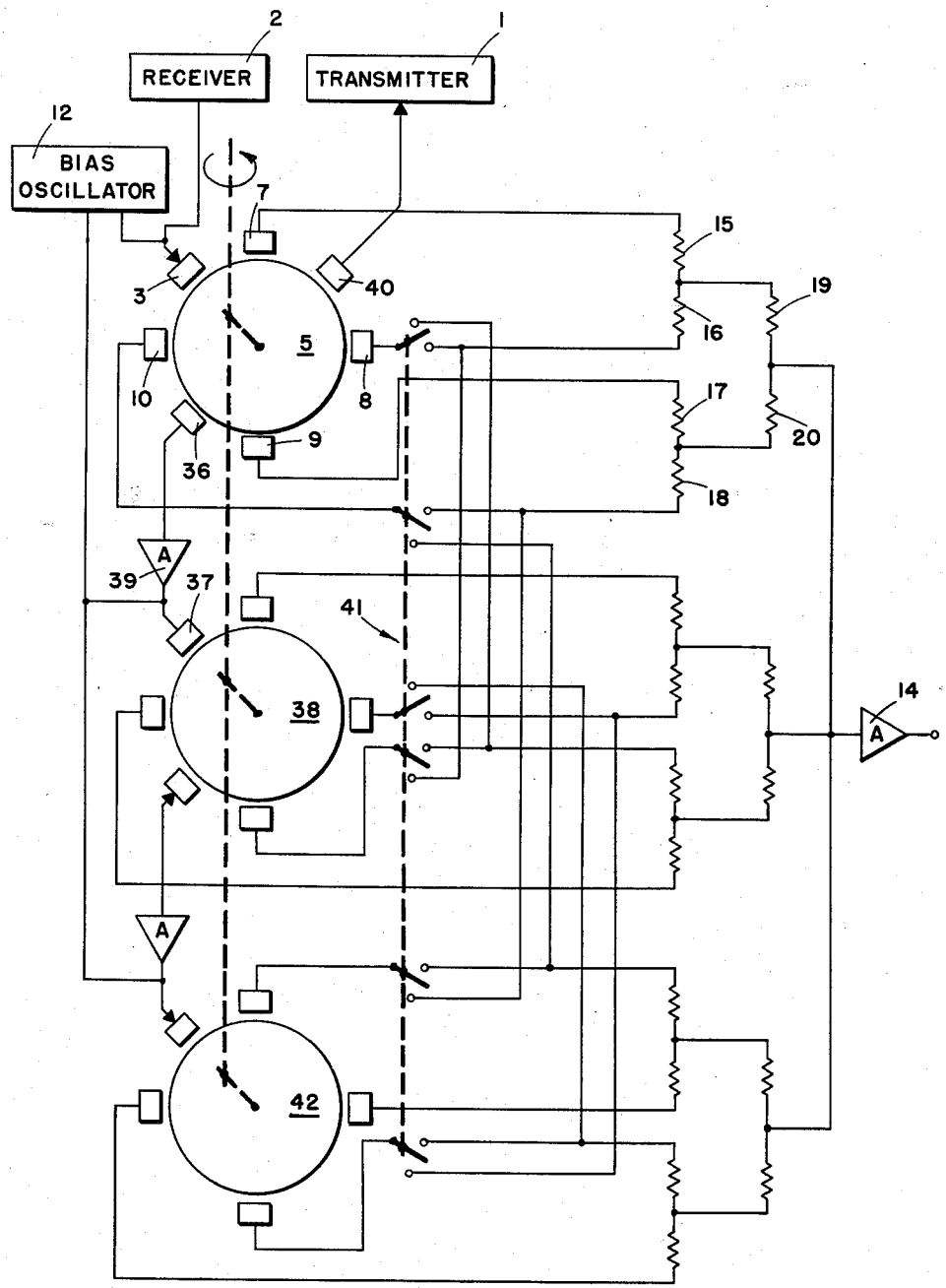

Other objects of invention will become apparent from the following description taken in connection with the accompanying drawings, in which Fig. 1 is a schematic diagram of the magnetic recording data analyzer receiving signals from a radar to provide moving target indication;

Fig. 2 is an enlarged portion of the head plate showing read head adjustment structure;

And Fig. 3 illustrates recording upon several discs or several channels of the same disc.

In Fig. 1, pulse modulation type radar transmitter 1 transmits radio frequency energy which is reflected and received by a non-limiting receiver 2 which provides video signals just as might be displayed on an A-scope, or P.P.I., to the write head 3 of a magnetic recorder 4. The recorder disc 5 is synchronized in rotation with the pulse repetition frequency of the radar transmitter by direct drive from generator 6 from which the pulses are obtained to trigger the transmitter 1. It is contemplated that the speed of the disc would be, for example, 10,000 r.p.m. By synchronization, the recorder disc 5, an aluminum alloy forging coated with magnetic paint, rotates at a speed so that repetitive return video signals are recorded at precise angular distances apart on the disc. This angle is indicated as being 90° in Fig. 1. A a result, four successive return signals occur simultaneously under read heads 7, 8, 9, and 10, shown considerably enlarged for clarity. Such arrangement, therefore, allows the return signals to be simultaneously "read" or "extracted." Another method of synchronization between the pulse repetition frequency of radar transmitter and the rotation of the disc would be to pulse the transmitter or its R.-F. generating tube (magnetron, klystron, etc.) by a read head located, for example, between heads 7 and 8 on rotating disc 5.

In a magnetic modulator system, as disclosed in patent application Serial No. 277,196, filed March 18, 1952, by Eugene R. Ingersoll et al., entitled "Magnetic Pulse Generator" (now abandoned) wherein the output of an A.-C. generator is shaped to provide the pulsing of the radar transmitter, the disc may be rotated by the shaft of the generator, as illustrated in Fig. 1. A disc type recorder is superior to a drum recorder. The write and read heads are of conventional ring construction and may be substantially identical.

Erase head 11, Fig. 1, which receives a high frequency signal of constant amplitude from oscillator 12, removes, or erases, each signal as it passes, allowing for the recording of new return signals. Oscillator 12 may also provide a recording bias for head 3. The output of the read heads is received at comparison circuit 13 which determines the difference between successive video return signals. It is this difference which indicates only the targets which have moved. If an object has not moved from one pulse to the next, there is substantially no change in the several video signals, successive return signals cancelling each other. Therefore, the clutter, or ground return, is cancelled. If an object has moved during the interval between pulses, successive video return signals will not entirely cancel each other and a signal of the moving target will remain.

A typical comparison circuit 13 including an amplifier 14, is shown in Fig. 1. Read head 7 is compared with read head 8 through resistors 15 and 16. (In general, either head 7 or 8 will have negative video output while the other has positive video output in this illustration. The same is true of heads 9 and 10.) Read head 9 is compared with read head 10 through resistors 17 and 18. The input to amplifier 14 through resistors 19 and 20 is, therefore, a signal representing the difference between two successive video signals reinforced by the difference between two previous signals. The amplifier provides an input to the intensity grid 21 of indicator 22 which indicates only those targets which have velocity. Sweep generator 24 provides a sweep voltage synchronized with transmitter 1 to the deflection plate of indicator 22.

Switch 23 provides for changing the interconnection of read heads. With the switch in the alternate position from that shown, the signal read by head 7 is compared with the signal read by head 9 received two pulses previously. Likewise, head 8 is compared with head 10. This interconnection renders the device more sensitive to lower velocity targets. If comparisons are made between heads still farther apart, even lower velocity targets are discernible. Particular read heads are chosen for comparison, then, according to the velocity selected. Several comparison circuits may be included to effect a moving target indicator which is more sensitive to certain velocities.

In order to render the information more reliable and complete, the differences in signals between heads of a pair may be summed in predetermined proportion. That is, the heads may be assigned reltaive weighting values in output by the proper choice of resistors 15, 16, 17, 18, 19, and 20, or by using read heads having differing number of turns in their windings. The relative output from head 7 through resistor 15 may have a relative voltage output level of 1; head 8, 2; head 9, —2; head 10, —1. The negative signs indicate connection in opposition to the positive heads. Objects which are immobile will still cancel out.

The construction of the recorder must meet certain requirements. The synchronization of the disc to the radar pulse interval within close limits is necessary in order that the recorded signals appear under the heads simultaneously for cancellation of the clutter. Also, initial adjustment of head position is of importance. Typical values encountered, such as a pulse length of 0.5 microsecond, 12,000 r.p.m. of a disc 10 inches in diameter, may require adjustment of heads 8, 9, and 10 relative to head 7 to within $6 \times 10^{-5}$ inches.

Fig. 2 indicates a method of precise adjustment of read head position in a plate 25 which might be used to hold the heads in proximity to a magnetic disc in a disc type recorder and is viewed from the underside, the recording side. There are several holes cut through head plate 25. These are slot 26 and rectangular holes 27, 28, 29, and 30. The magnetic head is mounted with recording surfaces 31 and 32 (high permeability pole pieces) flush with the underside of the head plate. Screw 33 consists of two sections having slightly different pitch. By adjustment of the screw head, fine adjustment of tension is obtained, and by adjustment of the nut 34, coarse adjustment of tension is obtained on bridge 35. Precise adjustment of the head in a circumferential direction can be obtained. If the disc is not required to operate over a wide range of speeds as in the usual case wherein the radar has fairly constant pulse repetition frequency, an alternate method of trimming the effective head position is the use of small delay line sections in each set of head leads, the delay of each small delay section being proportional so as to bring the signals from the several heads into synchronism.

In order that pulses of the clutter cancel each other, they must all be recorded at the same amplitude. Disc wobble causes varying amplitude in the recording and must be kept to a minimum. Dynamic balancing of the disc improves performance. A rough estimate of allowable wobble is 0.001 inch. An air bearing developed between the head plate and the disc will provide sufficient bearing stiffness to hold the disc and plate parallel within this tolerance.

An improved magnetic recorder which utilizes an air bearing to prevent disc wobble is disclosed in patent application Serial No. 413,315 to William Farrand et al., entitled "Magnetic Disc Recorder," filed March 1, 1954.

If longer delay intervals are required for the comparison of video return signals over longer periods of time, several discs may be used as indicated in Fig. 3. The write, read, and erase heads are supplemented by transfer heads such as 36 and 37, which transfer the information from disc 5 to disc 38, through amplifier 39. The information is thus retained for a longer period of time. This illustration is also representative of a single disc having several channels, the transfer heads transferring to succeeding channels instead of succeeding discs.

Inasmuch as the information read from disc 38 has passed through two pairs of transfer heads, the information on disc 38 has only passed one pair of transfer heads, and the information on disc 5 has passed no transfer head, it is necessary for accurate comparison of their information that the transfer heads be of high fidelity. In their design, particular attention must be given to acquiring a flat response. A method in which transfer from disc to disc is unnecessary would be one in which the information from receiver 2 is recorded on disc 5 until it is filled and then by switching means is recorded on disc 38 until it is filled and then disc 42 until it is filled. The information stored on all discs is read out and then cancelled at which time recording on disc 5 again commences.

Irregularity in intervals between pulses transmitted by the radar (jitter) is a problem which must be considered in obtaining pulse-to-pulse cancellation of the clutter. Careful design of the radar modulator and power supply to keep the pulse variation to less than 0.01 microsecond will accomplish this. Synchronization by a read head 40 located on disc 5 to trigger the transmitter 1 according to video return signals, as mentioned before, materially aids in obtaining proper cancellation of clutter. The distance between write head 3 and the trigger head 40 is the same as the distance between successive read heads 7 and 8 or 9 and 10. Switches such as 41 allow comparison between signals several intervals apart.

At optimum synchronization of disc speed and head spacing would be that in which the video return signals recorded in one rotation of the disc correspond to the number of pulses transmitted in one beam width of the radar. Repetition of information inherent in several pulses within a beam width is thus reduced.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A data analyzer comprising a magnetic recorder for receiving and recording successive signals, a plurality of pairs of read heads in said recorder disposed so as to read out several of said successive signals simultaneously, means for selecting the outputs of selected pairs of read heads, and means for determining the difference in output of selected read heads.

2. A data analyzer comprising a magnetic recorder for receiving and recording successive signals, a plurality of pairs of read heads in said recorder in fixed spaced relationship with respect to each other providing simultaneously reading of successive signals, voltage comparison means adapted to determine the difference between successive signals which have been read, and switch means connected to said read heads and said voltage comparison means so as to allow selection of heads to be compared.

3. In combination, a radar transmitter and a radar receiver, a magnetic recorder connected to receive the return signals from said radar receiver, means for synchronizing the rotation of said recorder and the pulse repetition frequency of the transmitter of said radar, means for simultaneously reading a plurality of successive recorded signals from said recorder, and means for comparing the signals which have been read.

4. In a moving target indication system, a radar transmitter and a radar receiver, a magnetic recorder connected to receive the video return signals of said radar receiver, means for synchronizing the rotation of said recorder and the pulse repetition frequency of the transmitter of said radar, a plurality of read heads in spaced relationship with respect to each other so as to provide simultaneous reading of a plurality of the recorded video return signals, and a comparison circuit connected to said read heads.

5. Apparatus providing moving target indication comprising a radar transmitter and radar receiver, a magnetic recorder connected to receive the repetitive video return signals provided by said radar receiver, means for synchronizing the pulse repetition frequency of said radar transmitter and the recording speed of said recorder, means for reading successively recorded signals simultaneously from said recorder, and means for determining the difference between selected signals which have been read.

6. The combination recited in claim 5 wherein the synchronized speed of said recorder is such that the return signals of one beam width of said radar transmitter are recorded in one rotation of said recorder.

7. Apparatus providing moving target indication comprising a radar transmitter and a radar receiver, a magnetic recorder connected to receive the video signals from said radar receiver, a plurality of pairs of magnetic reading heads relatively spaced with respect to each other to read successive signals simultaneously from said recorder, means for selecting the output signals of chosen pairs of magnetic reading heads for comparison, means for determining the difference between signals received from said chosen heads.

8. Apparatus providing moving target indication comprising a radar transmitter and a radar receiver, a magnetic recorder connected to receive the repetitive video return signals of said radar receiver, means for synchronizing the speed of said recorder with the pulse repetition frequency of said radar transmitter, magnetic reading heads disposed on said recorder to read successive signals simultaneously from said recorder, means for selecting the output signals of chosen magnetic reading heads, means for determining the difference between signals of said chosen reading reads, and means for summing the differences in predetermined proportions.

9. Apparatus providing moving target indication comprising a radar transmitter and a radar receiver, a magnetic recorder connected to receive the repetitive video signals from said radar receiver, means for synchronizing the speed of said magnetic recorder in accordance with the pulse repetition frequency of said transmitter, magnetic reading heads and recording heads connected to reproduce the signals recorded on said recorder and re-record said signals in successive recording channels, output magnetic reading heads connected to read successively recorded signals simultaneously from said recorder, means for selecting the signals of chosen output magnetic reading heads, means for determining the difference between said chosen reading heads.

10. A magnetic recorder adapted to receive and record successive signals, said recorder further adapted to be driven in synchronism with the pulse repetition frequency of a radar transmitter, a plurality of read heads in said recorder disposed to read out a plurality of said successive signals simultaneously, means for selecting the output signals of chosen read heads, means for combining the selected outputs of said heads in predetermined weighted proportions.

11. Apparatus providing moving target indication comprising a radar transmitter, a radar receiver, a magnetic recorder connected to be synchronized in recording speed with the pulse repetition frequency of said radar and connected to receive the repetitive video return signals of said radar receiver, magnetic reading heads for reading successively recorded signals simultaneously from said recorder, means for selecting the output of chosen magnetic reading heads, means for comparing the outputs of selected magnetic heads, means for summing the difference between signals in predetermined proportions.

12. A magnetic recorder adapted to receive and record successive signals, a plurality of read heads in said recorder disposed to read out several of said signals simultaneously, wherein said magnetic heads are constructed to provide predetermined weighted signal values with respect to each other, means for selecting the signals of chosen magnetic heads, means for combining said selected signals in predetermined proportion.

13. Apparatus providing moving target indication comprising a radar transmitter and a radar receiver, said radar receiver comprising a radar indicator, a magnetic recorder connected to receive the repetitive video return signal from said radar receiver, magnetic reading means connected to read successively recorded signals simultaneously from said recorder, means for selecting chosen pairs of magnetic reading heads, means for determining the differences between the signals of said selected chosen pairs, means for summing the differences of said selected pairs, and means for displaying the sum of said differences upon the radar indicator of said radar receiver.

References Cited in the file of this patent

UNITED STATES PATENTS

| | | |
|---|---|---|
| 2,410,424 | Brown | Nov. 5, 1946 |
| 2,566,189 | Gloess | Aug. 28, 1951 |